United States Patent [19]

Saunders

[11] 4,390,201
[45] Jun. 28, 1983

[54] LICENSE PLATE HOLD-OPEN DEVICE

[76] Inventor: Alton M. Saunders, 418 Seville Ave., Altamonte Springs, Fla. 32701

[21] Appl. No.: 211,015

[22] Filed: Nov. 28, 1980

[51] Int. Cl.³ .............................................. B62D 25/00
[52] U.S. Cl. .................................. 296/1 C; 292/338; 292/DIG. 15
[58] Field of Search ............... 296/1 C; 292/DIG. 15, 292/338; 217/60 R, 60 B

[56] References Cited

U.S. PATENT DOCUMENTS

| | | | |
|---|---|---|---|
| 3,905,637 | 9/1975 | Smith | 296/1 C |
| 3,915,491 | 10/1975 | Montgomery | 296/1 C |
| 4,236,746 | 12/1980 | LaVoie | 296/1 C |
| 4,253,198 | 3/1981 | Hodson | 296/1 C |
| 4,257,642 | 3/1981 | Sampson | 296/1 C |
| 4,270,784 | 6/1981 | Vanover | 296/1 C |
| 4,299,420 | 11/1981 | Piepho | 296/1 C |
| 4,361,354 | 11/1982 | Kemp | 296/1 C |

Primary Examiner—Richard A. Bertsch
Attorney, Agent, or Firm—Howard L. Rose

[57] ABSTRACT

A device is provided for use on vehicles having the gas tank inlet opening located behind a license plate, to hold the license plate open for access to the gas tank inlet opening. The device has a clip which is attached to a backing plate to which the license plate is attached. A second portion of the device is rotatably attached to said clip and is spring-biased with respect to the clip. When the license plate is in the open position, the second portion of this device has an arm which can be positioned to engage an adjacent surface of the bumper, or another adjacent surface of the vehicle. When the lever is placed in this position, the force of the spring will hold the license plate and backing plate in the open position. The second portion also includes a wire member, comprised of a single piece of wire, having its ends wrapped around the clip. The lever is attached to the wire member by a washer assembly which permits the lever to move laterally along the wire member and to rotate with respect to the wire member. These movements allow the size and the shape of the device to be adjusted so that a single device size can be employed on vehicles and bumpers of various sizes and on various vehicle rear end configurations.

11 Claims, 6 Drawing Figures

LICENSE PLATE HOLD-OPEN DEVICE

LICENSE PLATE HOLD-OPEN DEVICE

This invention relates to vehicle accessories. More particularly, this invention relates to devices for holding a vehicle license plate and the backing plate to which the license plate is attached, in a down or up position, as the case may be, to permit access to the gas tank filler spout located behind the license plate.

BACKGROUND OF THE INVENTION

Many automotive vehicles, including most American-made cars, have their gas tank inlet spouts and caps located behind the rear license plate and the backing plate to which the license plate is attached. The backing plate is usually hinged at its bottom or top to the frame of the vehicle. The license plate is then attached to the backing plate by one of many available means (i.e. bolts, clips, etc. ). The hinge is biased such that it holds the backing plate and the license plate in a vertical (closed) position and rotates the backing plate and license plate to their closed position (abutting the vehicle) whenever the license plate and backing plate are rotated out of this position.

To put gas in a vehicle as described above, one must pull down or up the backing plate and the license plate to a down or up or horizontal (open) position, and while holding the plates in this position, unscrew the gas cap, remove the gas cap and place it on the ground, the trunk of the vehicle, etc.; and then place the gas pump hose spout into the gas tank inlet spout. If the license plate and backing plate are then released, they will rest on the gas pump hose spout in a partially open position. If the gas pump hose spout does not have a device to keep the hose valve open until the gas tank is full, then one must keep one's hand on the gas activating level while filling the gas tank and the plates interfere with the hand.

When the desired amount of gas has been put into the gas tank, one must again depress the backing plate and license plate (which have been held open by the gas pump hose handle) to remove the gas pump hose spout and put the gas cap back on the end of the gas tank inlet spout.

As can be seen from the above, the inability to lock the backing plate and license plate in an open position causes these plates to always be in the way when one is putting gas into a vehicle's gas tank. Sometimes, persons putting gas into a car with the gas tank inlet spout located as described above, will jam the gas cap between the backing plate and the vehicle to hold open the backing plate. The gas cap can be easily dropped to the ground or otherwise damaged when utilized in this manner. Other persons may try and prop their knee, arm, etc. against the license plate and/or backing plate to hold them open. Holding the plates open in this manner may soil one's clothes or may cause the person to sustain minor cuts and bruises if the edges of the backing plate and license plate are jagged and/or if the person loses his balance while trying to maneuver to hold the plates open.

SUMMARY OF THE INVENTION

This invention provides a device to be employed on vehicles having the gas tank inlet spout located behind a license plate, either front or rear, that will hold open the license plate and the license plate backing plate, to which the license plate is attached, so that the plates will not interfere with a person putting gas into the vehicle.

The invention comprises a large wire clip which is clipped firmly onto the license plate backing plate. The invention includes a second portion which is rotatably attached to the large clip. This second portion is also spring-loaded with respect to said clip, the equilibrium position being when the second portion is at an approximate right angle with the clip. The second portion includes a wire lever arm which can be positioned under a surface of a bumper of the vehicle or another protrusion of the vehicle.

When the license plate and the license plate backing plate are swung open beyond a desired point, the lever arm can be pushed and/or rotated under the bumper (or another catching point) of the car. When this is accomplished, the second portion will be at a small acute angle with the clip. The spring will, of course, be exerting force against the clip, seeking to return to the equilibrium state. This force will hold the license plate and the license plate backing plate in the open position.

The second portion includes a wire support to which the lever is rotatably and movably (in a single lateral direction towards and away from the bottom of the clip) attached by a washer assembly. This configuration allows the size and shape of the device to be varied so that one device size can fit various vehicle rear end configurations and sizes.

IN THE DRAWINGS

DETAILED DESCRIPTION OF THE DRAWINGS

Figure 1:
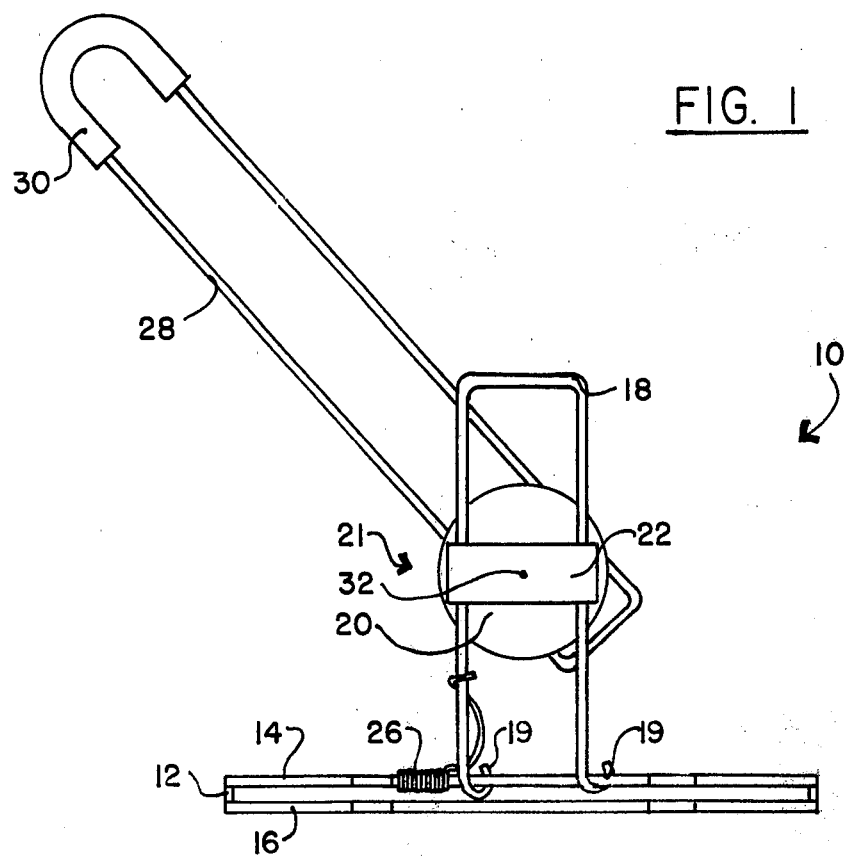
FIG. 1 is a front view of one embodiment of this invention, showing the embodiment in its equilibrium position.
Figure 2:
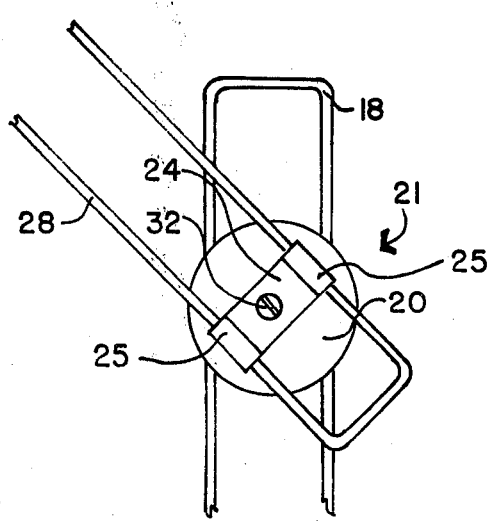
FIG. 2 is a rear view of a portion of the embodiment illustrated in FIG. 1.

Referring to the Figures, license plate hold-open device 10 is designed to be used on a vehicle having a license plate backing plate 36 connected to the vehicle by hinge 38. The vehicle must also have a protrusion such as bumper 34, for purposes later described. License plate hold-open device 10 comprised of license backing plate clip 12, and the second portion of hold-open device 10 including washer assembly 21, engaging lever 28 and wire support member 18. In the embodiment, illustrated in the Figures, license backing plate clip 12 is of a single piece of wire bent into the shape as shown in the Figures; normally a pair of square U-shaped members with wide legs. The wire forms upper U-shaped wire frame 14 and U-shaped lower wire frame 16, having approximately the same size and shape and spaced apart a short distance such that the backing plate of a license plate assembly of a vehicle will be firmly gripped between upper wire frame 14 and lower wire frame 16 when inserted therebetween.

Figure 3:
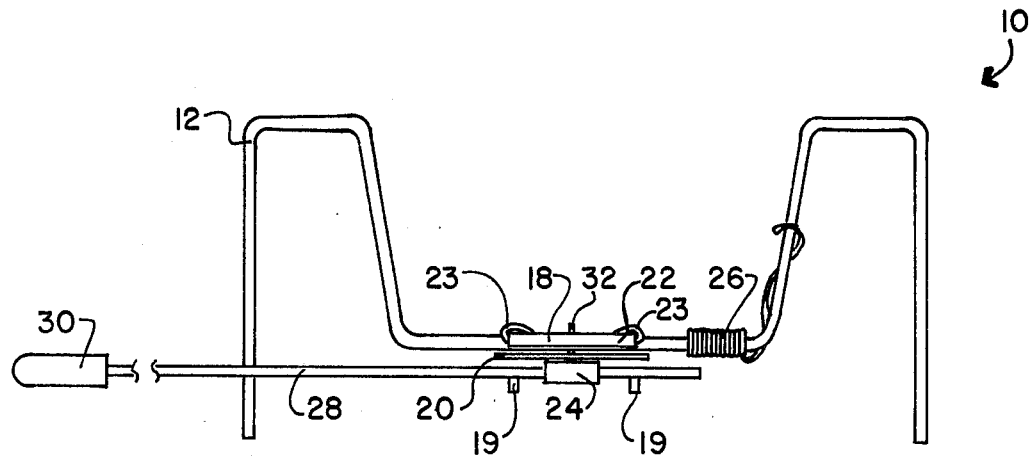
FIG. 3 is a plan view of the embodiment illustrated in FIG. 1, also showing the embodiment in the equilibrium position.

Rotatably attached to upper wire frame 14 is wire support member 18. Wire support member 18 is a single piece of wire bent into the U-shaped shown in FIG. 1 and has eyes 19 formed on the ends thereof that wrap around upper wire frame 14. Spring 26 is wound around a portion of upper wire frame 14 and is connected to upper wire frame 14 and wire support member 18 such that wire support member 18 is spring-biased at a right angle with respect to upper wire frame 14. In FIGS. 1 and 3, upper wire frame 14 and wire support member 18 are shown in their equilibrium positions with respect to spring 26, upper wire frame 14 being at an approximate right angle to wire support member 18.

Engaging lever 28 is comprised of a single piece of wire and is shaped more or less like a safety pin as shown in FIG. 1. Engaging lever 28 is attached to wire support member 18 by washer assembly 21 such that engaging lever 28 can rotate with respect to wire support member 18, and can be moved laterally along wire support member 18 towards and away from eyes 19.

Washer assembly 21 is comprised of washer 20, cross support 22, and cross support 24 mounted on screw 32. The two wires comprising the sides of the U-shape of wire support member 18 are slidably received between washer 20 and cross support 22. Cross support 22 is a small rectangular plate having its narrow ends 23 bent partially around wire support member 18, as shown in FIG. 3.

Cross support 24 is located on the opposite side of washer 20 from cross support 22. Cross support 24 is also a small rectangular piece of metal having its narrow ends 25 wrapped around the two wires comprising the sides of engaging lever 28. Thus, cross support 24 is firmly attached to engaging lever 28.

Note that cross support 22, washer 20, and cross support 24 are not fixedly connected together. Thus, each of these elements is free to rotate around screw 32 with respect to each other. This arrangement provides that engaging lever 28 is free to rotate with respect to wire support member 18. This capability, plus the device's capability to slide washer assembly 21 along wire support member 18, enables one size of hold-open device 10 to fit many different sizes and configurations of vehicle body configurations and sizes.

Bumper engager 28 has protective sleeve 30 wrapped around its end which engages the vehicle to protect the vehicle from scratches and to prevent the wire forming engaging lever 28 from quickly wearing out.

Figure 4:
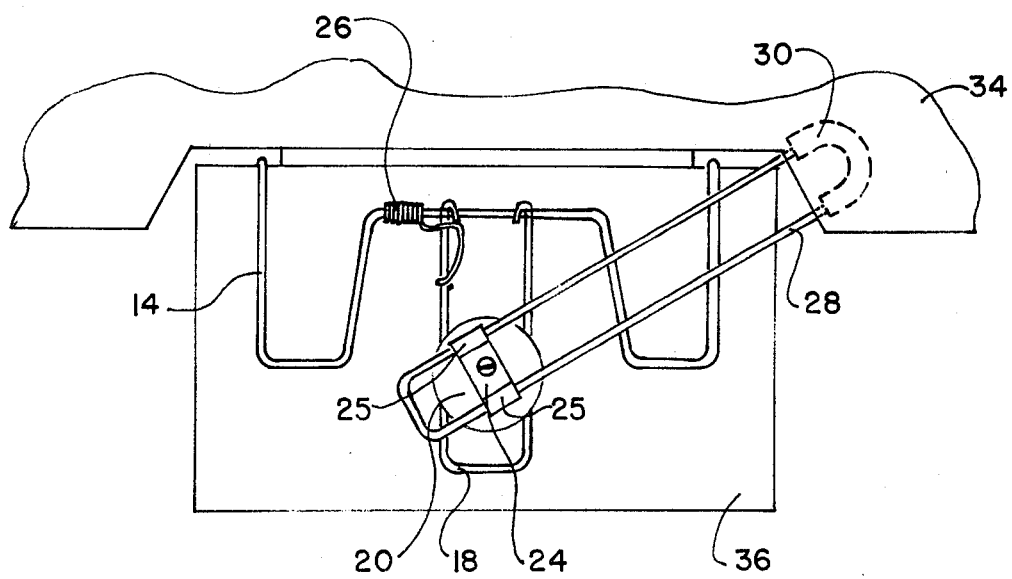
FIG. 4 is a plan view illustrating the embodiment of this invention illustrated in FIGS. 1-3 mounted on the bottom of a license plate backing plate and engaging the bumper of the car to hold the license plate and backing plate open.
Figure 5:
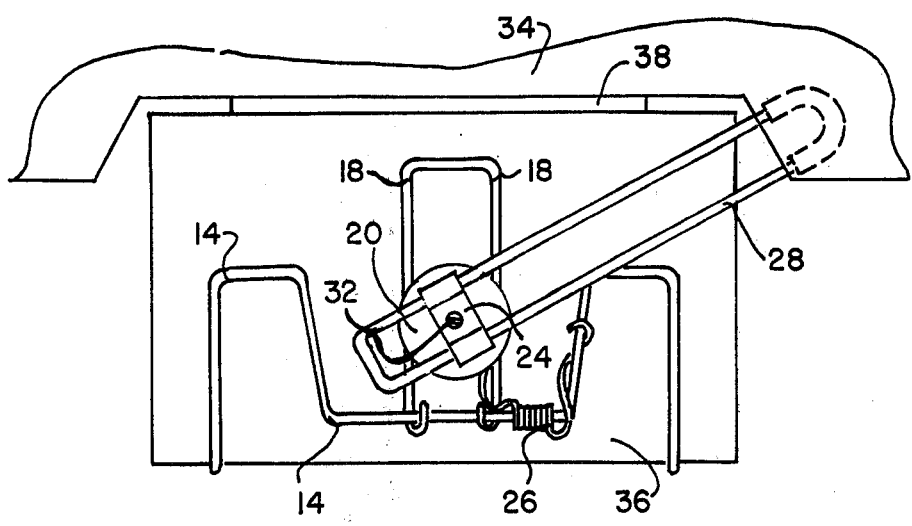
FIG. 5 is a plan view showing the embodiment illustrated in FIGS. 103 attached to the top of a backing plate and holding the license and backing plates in the open position.
Figure 6:
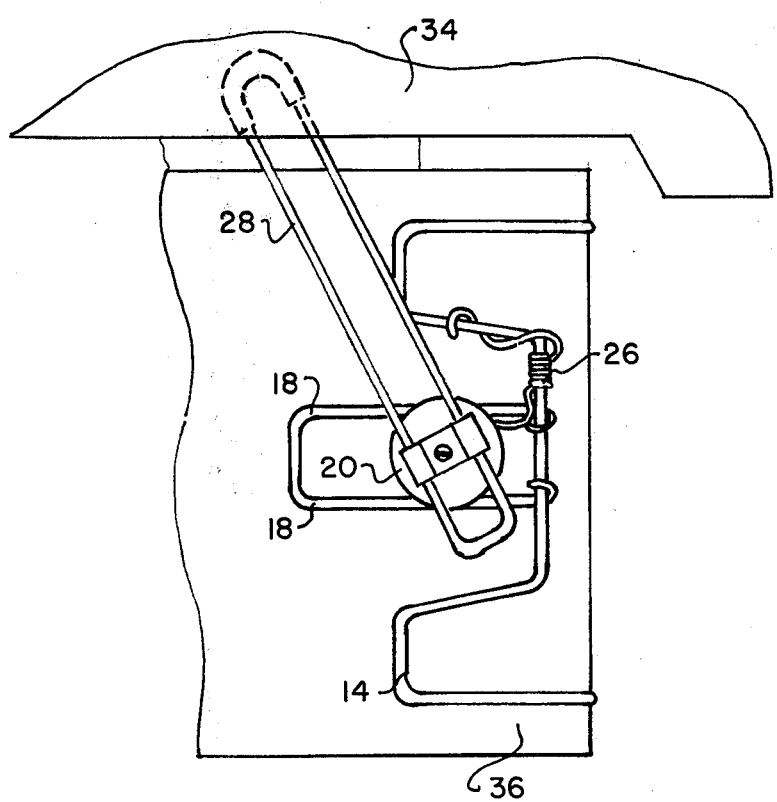
FIG. 6 is a plan view showing the embodiment of this invention illustrated in FIGS. 1-3 attached to yet a third possible location, the side of a license plate backing plate.

License plate hold-open device 10 is employed as follows: license plate hold-open device 10 can be clipped on many vehicle license plate backing plates which flip down or up, as the case may be, to allow access to the gas tank spout and cap. License plate hold-open device 10 is placed on the backing plate such that backing plate 36 is tightly gripped between upper wire frame 14 and lower wire frame 16 and such that wire support member 18 and bumper engager 28 are between backing plate 36 and the vehicle. Hold-open device 10 can either be placed on the bottom of backing plate 36, as shown in FIG. 4, on the top of backing plate 36, as shown in FIG. 5, or on the side of backing plate 36, as shown in FIG. 6.

When backing plate 36 is in the closed position, license plate hold-open device is pinned between backing plate 36 and the vehicle. When backing plate 36 is rotated to the open position, license plate backing clip 12 is, of course, also rotated in the same direction. When backing plate 36 is rotated more than 90°, wire support member 18 will then be in its equilibrium position at approximately a right angle with license backing plate clip 12. To hold backing plate 36 in the open position, wire support 18 and bumper engager 28 are pressed down until bumper engager 28 is under the bumper, or other protrusion, of the vehicle. When the bumper pressure on backing plate 36 is released, backing plate 36 will be held open due to the spring force pushing license plate backing plate clip 12 (now attached to backing plate 36) away from wire support member 18.

Once given the above disclosure, other features, modifications, and improvements will become apparent to one skilled in the art. Such features, modifications, and improvements are therefore considered to be within the scope of this invention as defined by the following claims:

I claim:

1. A device for holding a license plate of a vehicle in an open position; the license plate being attached to a license plate pivotally mounted backing plate connected to the vehicle and biased to a vertical position,
    said device comprising
    a first means slidably engaged with and secured to the backing plate,
    an elongated second means to engage the vehicle,
    a third means for connecting said first and second means wherein said third means is swingably connected to said first means and said third means is slidably and rotatably secured to said second means,
    said device being arranged and constructed such that said license plate is held open whenever said first means is engaging said backing plate and whenever said second means is engaging said vehicle.
2. A device according to claim 1
    wherein said first means is spring-biased with respect to said third means.
3. A device according to claim 2 wherein said third means comprises a connecting support member and said second means comprises a lever member, said third means being hingedly attached to said first means, and said second means being attached to said third means.
4. A device according to claim 3 wherein said second means is slidably attached to said third means, said second means being slidable along said third means in a direction perpendicular to the axis of rotation between said first means and said third means.
5. A device according to claim 4, further comprising a spring,
    said spring being attached to said first means and to said third means such that when it is in its equilibrium position, said third means is substantially abutting said first means.
6. A device according to claim 5, further comprising fourth means attaching said lever member to said third means such that said second means can be rotated with respect to said third means.
7. A device according to claim 6 wherein said fourth means comprises screw means having a washer and a first and a second cross support members mounted thereon, said connecting support member being slidably received between said washer and said first cross support member, said lever member being received by said second cross support member, said second cross support member being rotatable with respect to said washer.

8. A device according to claim 7 wherein said clip means is a single piece of wire bent into two symmetrical portions, with said backing plate being received between said symmetrical positions.

9. A device according to claim 3 wherein said elongated second means is a wire loop, and wherein said third means is comprised of a single piece of wire having its ends wrapped around said first means.

10. A device for holding a license plate of a vehicle in an open position;

the license plate being attached to a pivotally mounted backing plate connected to the vehicle and biased into a vertical position, said device comprising:

a first means for clipping over and so firmly gripping the backing plate, an elongated second U-shaped means for extending from its junction with the backing plate to be vehicle, a third U-shaped means having its ends wrapped around said first means, said means being spring-biased, and hinged to said first means, said third means also being slidably and rotatably secured to said second means, a fourth means for securing said second means to said third means in both a slidable and rotatably manner wherein said second means is slidably secured to one side of said fourth means and said third means is slidably secured to the opposite side of said fourth means whereby said second and third means are relatively rotatably and slidably adjustable so that when the first means engages said backing plate and said second means is actuated to engage said vehicle, the license backing plate is held open.

11. A device for holding a license plate of a vehicle in an open position, the license plate being attached to a backing plate connected to the vehicle and biased into a substantially vertical position, said device comprising:

a first means slidably engaged with and secured to the backing plate, an elongated second means to engage the vehicle, a third means hingedly connected to said first means, said second means slidably and rotatably connected to said third means, means biasing said third means into engagement with the backing plate upon movement of the backing plate to a generally horizontal position said second means being movable into engagement with the vehicle to hold the backing plate into a generally horizontal position.

* * * * *